United States Patent
Baek et al.

(10) Patent No.: US 8,515,259 B2
(45) Date of Patent: Aug. 20, 2013

(54) METHOD FOR PROVIDING PROGRESSIVE DOWNLOAD SERVICE FOR PLAYBACK APPARATUS SUPPORTING BD-J SPECIFICATION

(75) Inventors: Wonjang Baek, Gyeonggi-do (KR); John Kim, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 244 days.

(21) Appl. No.: 12/882,665

(22) Filed: Sep. 15, 2010

(65) Prior Publication Data

US 2011/0069935 A1 Mar. 24, 2011

(30) Foreign Application Priority Data

Sep. 21, 2009 (KR) .................. 10-2009-0089058

(51) Int. Cl.
*H04N 5/76* (2006.01)
*H04N 7/173* (2011.01)

(52) U.S. Cl.
USPC ............ 386/294; 386/291; 386/295; 725/86; 725/91; 725/92; 725/94; 725/95; 725/96; 725/97; 725/103

(58) Field of Classification Search
USPC ................ 386/291, 294, 295; 725/86, 91, 725/92, 94, 95, 96, 97, 103
See application file for complete search history.

(56) References Cited

U.S. PATENT DOCUMENTS

| 7,676,142 | B1 * | 3/2010 | Hung ........................ 386/233 |
| 7,784,076 | B2 * | 8/2010 | Demircin et al. ............ 725/81 |
| 2005/0076136 | A1 * | 4/2005 | Cho et al. .................. 709/231 |
| 2005/0188407 | A1 * | 8/2005 | van Beek et al. ........... 725/81 |
| 2006/0026663 | A1 * | 2/2006 | Kortum et al. .............. 725/134 |
| 2009/0217331 | A1 * | 8/2009 | Park et al. ................... 725/103 |
| 2010/0095337 | A1 * | 4/2010 | Dua .............................. 725/110 |

FOREIGN PATENT DOCUMENTS

KR  1020070121420 A  12/2007

OTHER PUBLICATIONS

Korean Office Action, date Mar. 7, 2011, three (3) pages.

* cited by examiner

*Primary Examiner* — Daquan Zhao
(74) *Attorney, Agent, or Firm* — Stein IP, LLC

(57) ABSTRACT

A method for providing a progressive download service for a playback apparatus supporting a BD-J specification is disclosed. In accordance with the present invention, a standby time and a communication overhead necessary for receiving and playing a A/V data by a playback apparatus supporting a BD-J specification are minimized by dividing and playing a first clip and a second clip according to a size of clips.

6 Claims, 7 Drawing Sheets

| Time lapsed (in seconds) | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| clip #1 | R |   |   |   |   |   |   |   |   |   |   |   |   |   |   |   |   |   |   |   |
| clip #2 |   | W | P | P |   |   |   |   |   |   |   |   |   |   |   |   |   |   |   |   |
| clip #3 |   | R | W | W | P |   |   |   |   |   |   |   |   |   |   |   |   |   |   |   |
| clip #4 |   |   | R | W | W | W | P |   |   |   |   |   |   |   |   |   |   |   |   |   |
| clip #5 |   |   |   | R | W | W | W | P |   |   |   |   |   |   |   |   |   |   |   |   |
| clip #6 |   |   |   |   | R | W | W | W | P | P |   |   |   |   |   |   |   |   |   |   |
| clip #7 |   |   |   |   |   | R | W | W | W | W | P |   |   |   |   |   |   |   |   |   |
| clip #8 |   |   |   |   |   |   | R | R | W | W | W | W | P |   |   |   |   |   |   |   |
| clip #9 |   |   |   |   |   |   |   |   | R | R | W | W | W | P |   |   |   |   |   |   |
| clip #10 |   |   |   |   |   |   |   |   |   |   | R | R | W | W | W | W | P |   |   |   |
|  |   |   |   |   |   |   |   |   |   |   |   | R | R | W | W | W | R | P | P |   |
|  |   |   |   |   |   |   |   |   |   |   |   |   |   | R | R | R | R | R | R | R |
|  |   |   |   |   |   |   |   |   |   |   |   |   |   |   |   |   |   | P | P | P |

*Fig. 7*

METHOD FOR PROVIDING PROGRESSIVE DOWNLOAD SERVICE FOR PLAYBACK APPARATUS SUPPORTING BD-J SPECIFICATION

This application claims the benefit of Korean Patent Application No. 10-2009-0089058 filed on Sep. 21, 2009, which is hereby incorporated for reference.

BACKGROUND OF THE INVENTION

1. Field of the Invention

The present invention relates to a method for providing a progressive download service for a playback apparatus supporting a BD-J specification, and more particularly to a method for providing a progressive download service for a playback apparatus supporting a BD-J specification wherein a standby time and a communication overhead necessary for receiving and playing a A/V data by a playback apparatus supporting a BD-J specification are minimized by dividing and receiving the A/V data according to a size of clips using a clip division information.

2. Description of the Related Art

A Blu-ray specification is designed by Blu-ray Disc Association ("BDA"), whose members include Sony, Hitachi and Sharp. The Blu-ray specification includes a specification of a Blu-ray disk which is an optical disc that may be read and recorded using a blue laser.

While a diameter and a thickness of the Blu-ray disk, which are 12 cm and 1.2 mm, respectively, are same as those of conventional CD (Compact Disc) and DVD (Digital Versatile Disc), a storage capacity thereof is larger than those of the conventional CD and DVD.

Because the blue laser having a wavelength of 405 nm is used for reading the Blu-ray disk instead of a red laser having a wavelength of 650 nm used for reading the DVD, more data can be stored in the Blu-ray disk than the DVD.

Specifically, a single layer Blu-ray disk is capable of storing up to 25 GB of a data and a dual layer Blu-ray disk is capable of storing up to 50 GB of the data. This means that the Blu-ray disk can store five times more data than the DVD.

Moreover, a quad layer Blu-ray disk and an octal layer Blu-ray disk can store up to 100 GB and 200 GB, respectively.

The Blu-ray disk supports a video compression codec of MPEG-2 which is widely used in the DVD. Moreover, BDA standard specification requires the Blu-ray disk to use H.264/AVC or VC-1 as the video compression codec which provides improved compression ratio compared to MPEG-2.

In addition, the Blu-ray disk supports audio formats such as Dolby Digital Plus, Dolby TrueHD and DTS-HD Master Audio as well as PCM (Pulse-code modulation), Dolby Digital and DTS.

A Blu-ray player supporting a BD-J specification supports an interactive service based on JAVA. Moreover, the Blu-ray player supporting the BD-J specification supports a network connectivity, a PIP (Picture-In-Picture) and a connection to a local storage.

A Blu-ray player supporting a BD-Live specification is capable of playing the streaming data received through a network communication in addition to the above-described capabilities.

A Virtual File System ("VFS") enables a playback of the streaming data which is not stored in the Blu-ray disk. Specifically, the VFS configures a virtual package on the Blu-ray player to enable the Blu-ray player to play the streaming data received through a USB port or the network communication as if the streaming data is stored in the Blu-ray disk.

Hereinafter, "a playback apparatus supporting the BD-J specification" includes the Blu-ray player supporting the BD-J specification or an apparatus using a middleware supporting the BD-J specification such as a TV, a set-top box, a PMP (Portable Multimedia Player), a video game console, a PC (Personal Computer) and a PVR (Personal Video Recorder).

The apparatus using the middleware supporting the BD-J specification is not required to have a Blu-ray disk reading capability.

FIG. 1 is a diagram illustrating a configuration for providing an audio/video data in accordance with a conventional method.

The audio/video data, which will be referred to as A/V data hereinafter, may include one of an audio data, a video data and combinations thereof.

An A/V data providing server generates a BUMF (Binding Unit Manifest File) information, an SF (Signature File) information, a playlist information, a clip information and a movie clip according to the BD-J specification.

The BUMF information defines a configuration of a virtual package in XML (Extensible Markup Language) format. For instance, the BUMF information includes a file name information and a binding information on the movie clip included in the A/V data received from the A/V data providing server.

The SF information is used for verifying a validity of the BUMF information. The SF information uses SHA (Secure Hash algorithm)-1.

The playlist information includes an information on the A/V data to be played. For instance, the playlist information includes a playback sequence information, a PlayItem information and a PlayListMark information of clips #1 through #100.

The clip information includes an information required for playing the movie clip. For instance, the clip information includes a stream format information of the corresponding clip, a number of packets included in the corresponding clip, an encoding specification of the corresponding clip and a time stamp information.

The A/V data included in each of the clips #1 through #100 may be different from one another. However, the clips #1 through #100 may have a same size or a same length which is obtained by dividing one large clip or one long clip into smaller or shorter clips.

The playback apparatus stores in a BUDA (Binding Unit Data Area) the BUMF information, the SF information, the playlist information and the clip information received from the A/V data providing server. The playback apparatus carries out a package update from a disk package to the virtual package based on the BUMF information, the SF information, the playlist information and the clip information stored in the BUDA. That is, the playback apparatus is configured to play the clips #1 through #100 received from the A/V data providing server instead of playing a data stored in the Blu-ray disk.

When a configuration of the playback apparatus is complete, the playback apparatus receives from the A/V data providing server and progressively plays the clips #1 through #100. Specifically, the playback apparatus receives the clips #1 through #100 using a progressive download scheme. For instance, when the playback apparatus starts receiving and finishes receiving the clip #1, the playback apparatus starts playing the clip #1 and starts receiving the clip #2 simultaneously. Moreover, when the playback apparatus finishes receiving the clip #2, the playback apparatus starts playing the clip #2 and starts receiving the clip #3 simultaneously.

However, there are certain disadvantages when the playback apparatus employs the progressive download scheme.

When the number of the clips that are to be played is small, a standby time necessary for downloading the clips increases. For instance, when the clips #1 through #100 having a size of 2 GB in total are to be is received, and a time necessary for downloading each of the clips is 20 seconds, the standby time is about 20 seconds. Moreover, if two clips are buffered by the playback apparatus, the standby time is about 40 seconds. Therefore, when the number of the clips is small, the standby time increases.

Increasing the number of the clips in order to overcome above disadvantages also has some disadvantages.

For instance, when the clips #1 through #1000 having a size of 2 GB in total are to be received, and a time necessary for receiving each of the clips is 2 seconds, the standby time is about 2 seconds.

That is, when the number of the clips is increased, the standby time decreases. However, a size of a clip information increases as the number of the clips is increased. Moreover, a communication overhead increases because a communication should be established between the A/V data providing server and the playback apparatus for every clip.

SUMMARY OF THE INVENTION

It is an object of the present invention to provide a method for providing a progressive download service for a playback apparatus supporting a BD-J specification wherein a standby time and a communication overhead necessary for receiving and playing a A/V data by a playback apparatus supporting a BD-J specification are minimized by dividing and receiving the A/V data according to a size of clips using a A/V data division information.

In order to achieve above-described object of the present invention, there is provided a method for providing a progressive download service for an A/V data providing server and a playback apparatus supporting a BD-J specification, the method comprising steps of: (a) preparing an A/V data; (b) dividing the A/V data into a plurality of clips including a first clip group and a second clip group using a clip division information, wherein the first clip group includes one or more first clips each having a first size and the second clip group includes one or more second clips each having a second size larger than the first size; and (c) transmitting the plurality of clips from the A/V data providing server to the playback apparatus.

The method in accordance with the present invention may further comprise after carrying out the step (b): (d) generating a playback sequence information for the plurality of clips so that the one or more first clips are played before the one or more second clips are played; and (e) transmitting the playback sequence information from the A/V data providing server to the playback apparatus.

The method in accordance with the present invention may further comprise receiving from the playback apparatus a clip request according to the playback sequence information, and wherein the step (c) comprises transmitting the plurality of clips to the playback apparatus in response to the clip request.

Preferably, the clip division information comprises at least one of the first size, the second size, a number of the one or more first clips, a media network bandwidth of the A/V data, a customer network bandwidth necessary for transmitting the A/V data to the playback apparatus and a number of buffered clips.

Preferably, a first mathematical expression $$B_a \times \frac{S_s}{CB} + N \times \frac{S_s}{MB} \geq N \times \frac{S_s}{CB} + \frac{S_c}{CB}$$

is satisfied, where $S_s$ represents the first size, $S_c$ represent the second size, N represents the number of one or more first clips, MB represents the media network bandwidth, CB represents the customer network bandwidth and $B_a$ represents the number of buffered clips.

The method in accordance with the present invention may further comprise obtaining the first size, the second size, the media network bandwidth, the customer network bandwidth and the number of buffered clips from the clip division information; and selecting the number of the one or more first clips satisfying a second mathematical expression $$N \geq \frac{MB \times [S_c - B_a \times S_s]}{S_s \times [CB - MB]},$$

where $S_s$ represents the first size, $S_c$ represent the second size, N represents the number of one or more first clips, MB represents the media network bandwidth, CB represents the customer network bandwidth and $B_a$ represents the number of buffered clips.

The method in accordance with the present invention may further comprise obtaining the first size, the number of the one or more first clips, the media network bandwidth, the customer network bandwidth and the number of buffered clips; and selecting the second size satisfying a third mathematical expression $$S_c \leq S_s \times \left[ \frac{N(CB - MB) + B_a \times MB}{MB} \right],$$

where $S_s$ represents the first size, $S_c$ represent the second size, N represents the number of one or more first clips, MB represents the media network bandwidth, CB represents the customer network bandwidth and $B_a$ represents the number of buffered clips.

Preferably, the customer network bandwidth is obtained by establishing a communication with the playback apparatus.

Preferably, the customer network bandwidth is selected from a customer network bandwidth group.

BRIEF DESCRIPTION OF THE DRAWINGS

FIG. 7 is a diagram illustrating states of clips according to time in accordance with the present invention.

DETAILED DESCRIPTION OF THE INVENTION

A method for providing a progressive download service for a playback apparatus supporting a BD-J specification in accordance with the present invention will be described in detail with reference to accompanied drawings.

Figure 1:
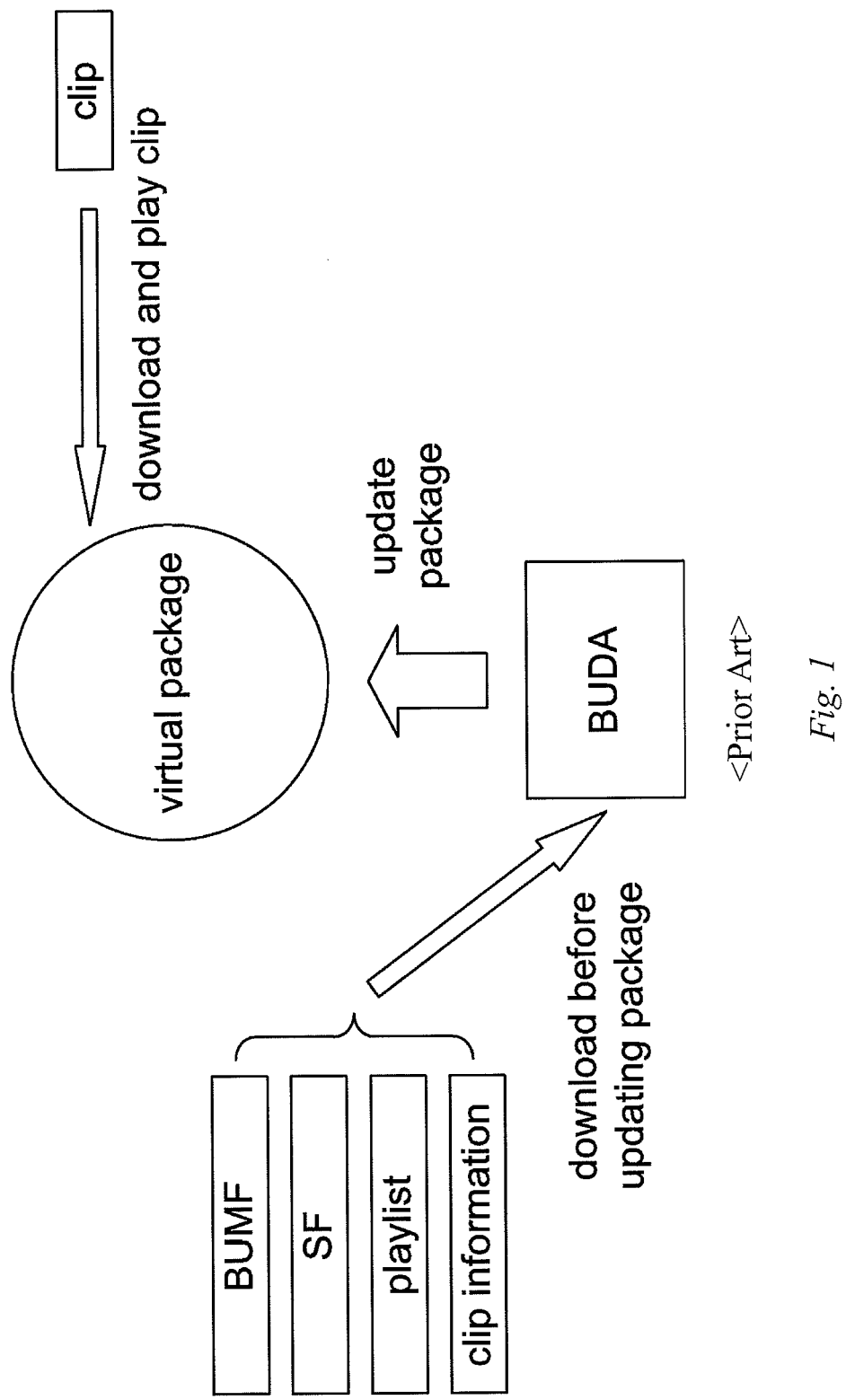
FIG. 1 is a diagram illustrating a configuration for providing an audio/video data in accordance with a conventional method.
Figure 2:
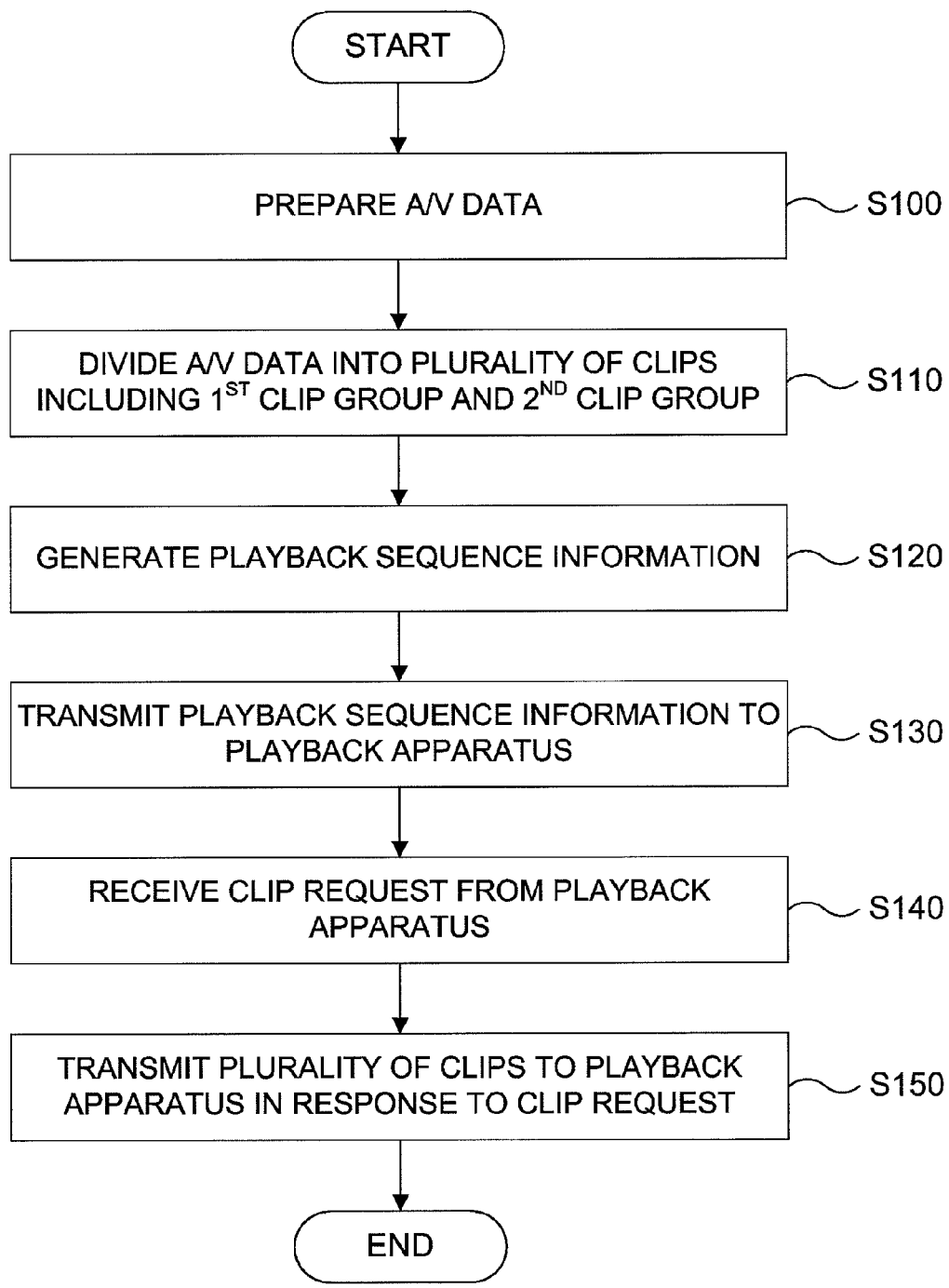
FIG. 2 is a flow diagram illustrating a method for providing a progressive download service for a playback apparatus supporting a BD-J specification in accordance with the present invention.

FIG. 2 is a flow diagram illustrating a method for providing a progressive download service for a playback apparatus supporting a BD-J specification in accordance with the present invention.

The method for providing the progressive download service for the playback apparatus supporting the BD-J specification in accordance with the present invention is carried out in an A/V data providing server and the progressive download service is provided to the playback apparatus.

Referring to FIG. 2, the A/V data providing server prepares an A/V data (S100). Specifically, the A/V data providing server may receive the A/V data from a separate A/V data storage device through wired/wireless network. Moreover, the A/V data providing server may receive the A/V data from an imaging device such as a video camera.

Thereafter, the A/V data providing server divides the A/V data received in the step S100 into a plurality of clips including a first clip group and a second clip group using a clip division information (S110).

The first clip group includes one or more first clips each having a first size, and the second clip group includes one or more second clips each having a second size which is larger than the first size.

While the one or more first clips are of a same size, i.e., the first size, the A/V data included in each of the one or more first clips may be different from one another.

Moreover, while the one or more second clips are of a same size, i.e., the second size, the A/V data included in each of the one or more second clips may be different from one another.

Figure 3:
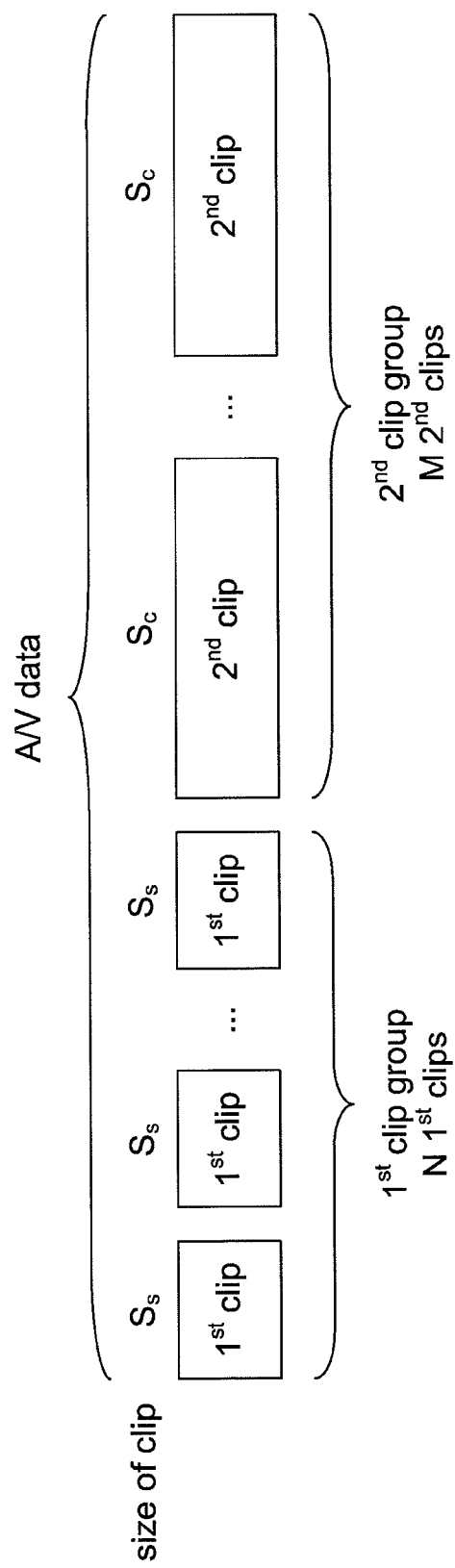
FIG. 3 is a diagram exemplifying a configuration of the A/V data divided into the plurality of clips including a first clip group and a second clip group in accordance with the present invention.

FIG. 3 is a diagram exemplifying a configuration of the A/V data divided into the plurality of clips including the first clip group and the second clip group in accordance with the present invention.

Referring to FIG. 3, the first clip group includes N first clips of substantially the same size, i.e., the first size which is denoted as $S_s$, where N is a natural number representing the number of the first clips. Moreover, the second clip group includes M second clips of substantially the same size, i.e., the second size denoted as $S_c$, where M is a natural number representing the number of the second clips.

It is preferable that the second size is more than ten times larger than the first size in order to minimize a standby time and a communication overhead necessary for a playback of the A/V data.

The clip division information is described hereinafter in greater detail.

The clip division information may include at least one of $S_s$ which may be expressed in unit of Mb (Megabit), $S_c$ which may also be expressed in unit of Mb, N, a media bandwidth MB which may be expressed in unit of Mbps (Megabits per second), a customer network bandwidth CB which may also be expressed in unit of Mbps and the number of buffered clips $B_a$. When the A/V data providing server communicates with the playback apparatus and receives the clip division information, the A/V data providing server may obtain $S_s$, $S_c$, N, CB and $B_a$ from the clip division information.

The media network bandwidth MB defines a minimum customer network bandwidth necessary for the playback of the A/V data. For instance, when a bitrate of the A/V data is 10 Mbps, the media network bandwidth MB may be about 10 Mbps.

The customer network bandwidth CB defines a communication speed between the A/V data providing server and the playback apparatus.

The number of buffered clips $B_a$ defines a minimum number of clips to be buffered by the playback apparatus. For instance, when the number of buffered clips $B_a$ is two, two clips are always buffered in a buffer of the playback apparatus.

In order to for the playback apparatus to play the A/V data without interruption, one of the second clip of the M second clips should be received before all of the N first clips are played.

That is, one of M second clips which is to be played first must be received by the playback apparatus before all of the N first clips are played.

Therefore, a sum of a time $$\left( = B_a \times \frac{S_s}{CB} \right)$$

necessary for receiving the N first clips buffered according to the number of buffered clips $B_a$ and a time $$\left( = N \times \frac{S_s}{MB} \right)$$

necessary for playing all of the N first clips should be larger than a sum of a time $$\left( = N \times \frac{S_s}{CB} \right)$$

necessary for receiving all of the N first clips and a time $$\left( = \frac{S_c}{CB} \right)$$

necessary for receiving one of the M second clips which is to be played first.

This may be expressed as mathematical expression #1.

$$B_a \times \frac{S_s}{CB} + N \times \frac{S_s}{MB} \geq N \times \frac{S_s}{CB} + \frac{S_c}{CB} \qquad \text{[Mathematical expression \#1]}$$

A process for dividing the A/V data by the A/V data providing server is described hereinafter in greater detail.

Figure 4:
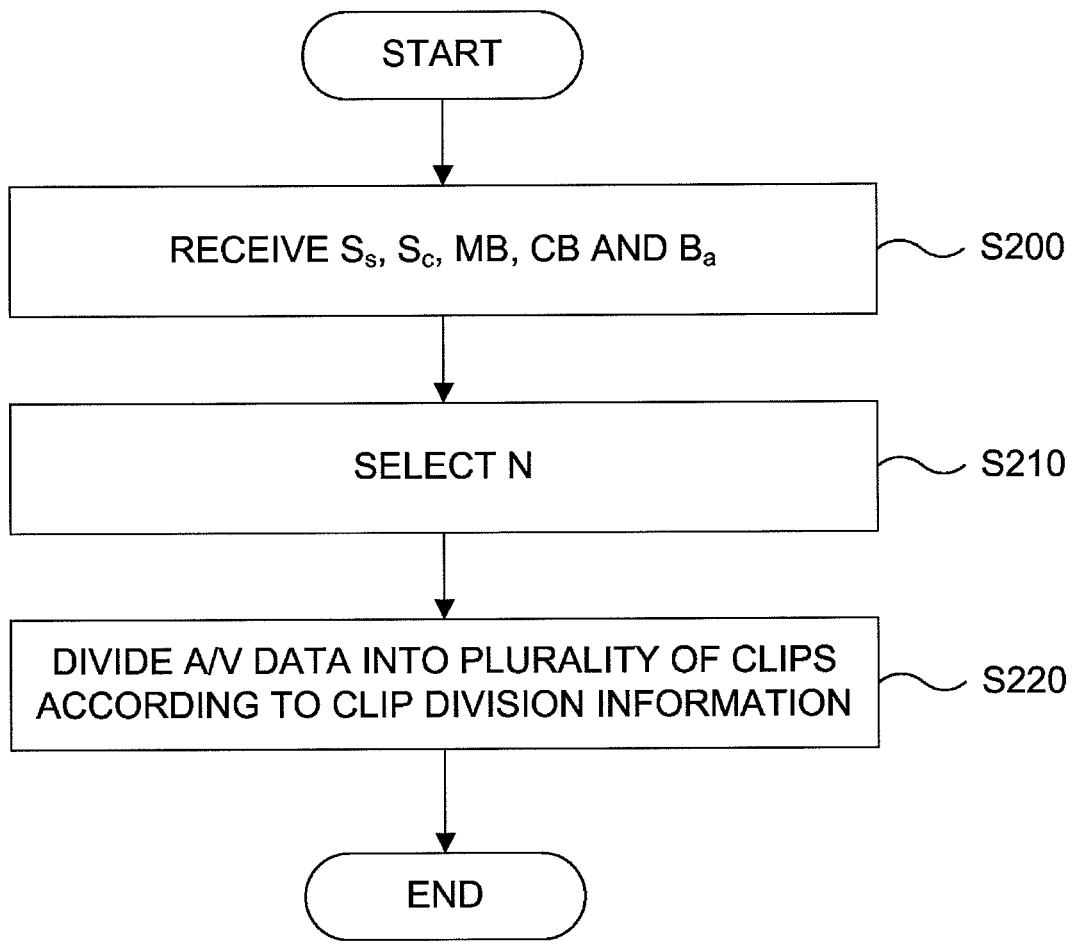
FIG. 4 is a flow diagram illustrating a process for dividing the A/V data by a A/V data providing server in accordance with an embodiment of the present invention.

FIG. 4 is a flow diagram illustrating a process for dividing the A/V data by the A/V data providing server in accordance with an embodiment of the present invention wherein the number N is obtained from the mathematical expression #1.

Referring to FIG. 4, the playback apparatus receives the clip division information and obtains $S_s$, $S_c$, MB, CB and $B_a$ from the clip division information (S200).

Thereafter, the A/V data providing server selects the number N that satisfies the mathematical expression #1 (S210).

That is, the number N is determined from mathematical expression #2 which is obtained from the mathematical expression #1 by expressing the number N in function of MB, $S_c$, $S_s$ and $B_a$.

$$N \geq \frac{MB \times [S_c - B_a \times S_s]}{S_s \times [CB - MB]} \quad \text{[Mathematical expression \#2]}$$

The A/V data providing server selects the number N according to mathematical expression #2.

Thereafter, the A/V data providing server divides the A/V data into the N first clips and the M second clips according to N, $S_c$ and $S_s$ (S220).

Figure 5:
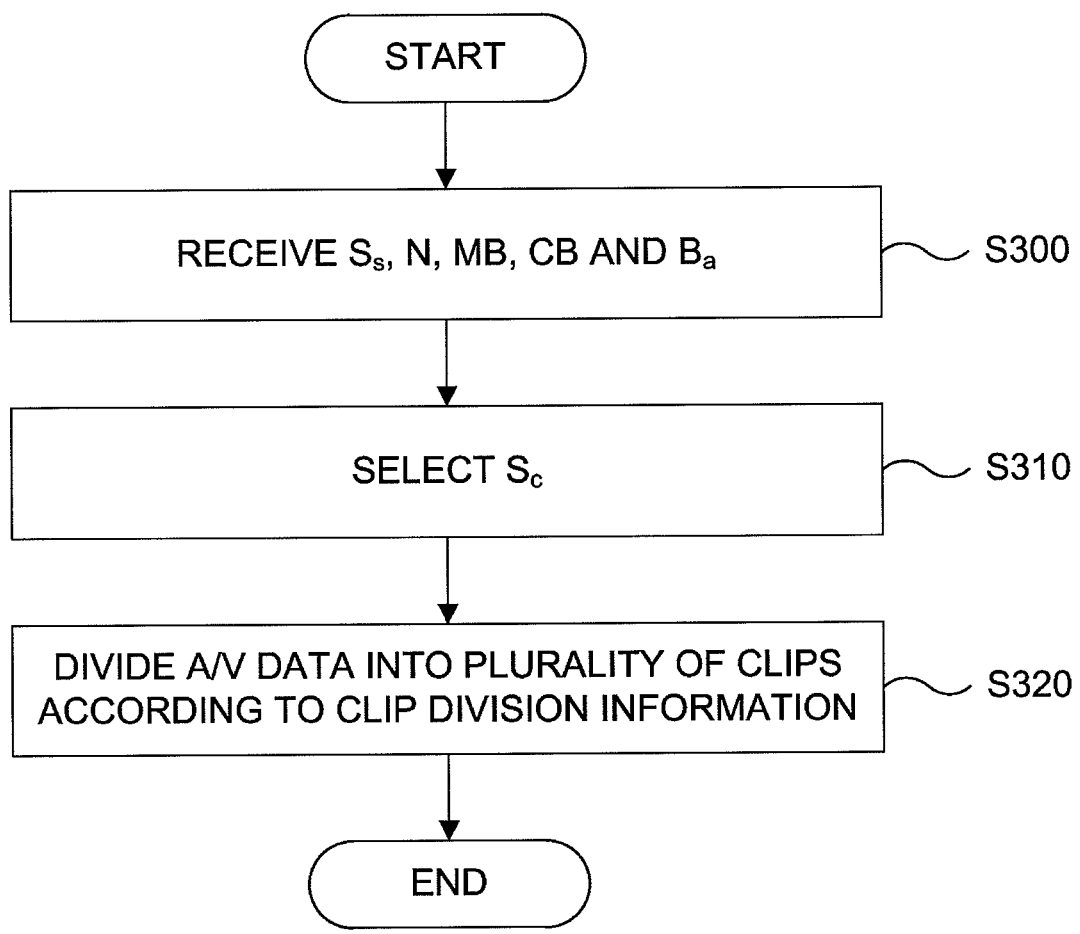
FIG. 5 is a flow diagram illustrating a process for dividing the A/V data by a A/V data providing server in accordance with another embodiment of the present invention.

FIG. 5 is a flow diagram illustrating a process for dividing the A/V data by the A/V data providing server in accordance with another embodiment of the present invention wherein the second size $S_c$ is obtained from the mathematical expression #1.

Referring to FIG. 5, the A/V data providing server receives the clip division information and obtains $S_s$, N, MB and $B_a$ from the clip division information (S300).

Thereafter, the A/V data providing server selects $S_c$ that satisfies the mathematical expression #1 (S310).

That is, the second size $S_c$ is determined from mathematical expression #3 which is obtained from the mathematical expression #1.

$$S_c \leq S_s \times \left[\frac{N(CB - MB) + B_a \times MB}{MB}\right] \quad \text{[Mathematical expression \#3]}$$

The A/V data providing server selects $S_c$ according to the mathematical expression #3.

Thereafter, the A/V data providing server divides the A/V data into the N first clips and the M second clips according to N, $S_c$ and $S_s$ (S320).

In another embodiment, the A/V data providing server may divide the A/V data based the customer network bandwidth CB obtained by establishing a communication with the playback apparatus.

Specifically, the A/V data providing server divides the A/V data based on the clip division information configured according to one of customer network bandwidths CB included in a customer network bandwidth group. The A/V data providing server may then and transmits the divided A/V data to the playback apparatus according to the customer network bandwidth CB obtained by establishing the communication with the playback apparatus.

For instance, when the customer network bandwidth group includes the customer network bandwidths CB of 4 Mbps, 10 Mbps and 100 Mbps, the A/V data providing server generates multiple sets of divided A/V data that are within the range of the customer network bandwidths of 4 Mbps, 10 Mbps and 100 Mbps. One of the sets of the divided A/V data corresponding to an actual customer network bandwidth CB obtained by establishing the communication between the A/V data providing server and the playback apparatus is then transmitted.

Referring back to FIG. 2, the A/V data providing server generates a playback sequence information for the plurality of clips (S120). Preferably, the A/V data providing server generates the playback sequence information so that the N first clips are played before the M second clips are played.

Thereafter, the A/V data providing server transmits the playback sequence information to the playback apparatus (S130).

Thereafter, when the playback apparatus generates a clip request according to the playback sequence information received from the A/V data providing server and transmits the clip request to the A/V data providing server (S140). Specifically, the playback apparatus generates the clip request for requesting the clip to be received according to a list and a sequence of the clips included in the playback sequence information.

Thereafter, the A/V data providing server transmits the plurality of clips divided in the step S110 to the playback apparatus in response to the clip request (S150).

Figure 6:
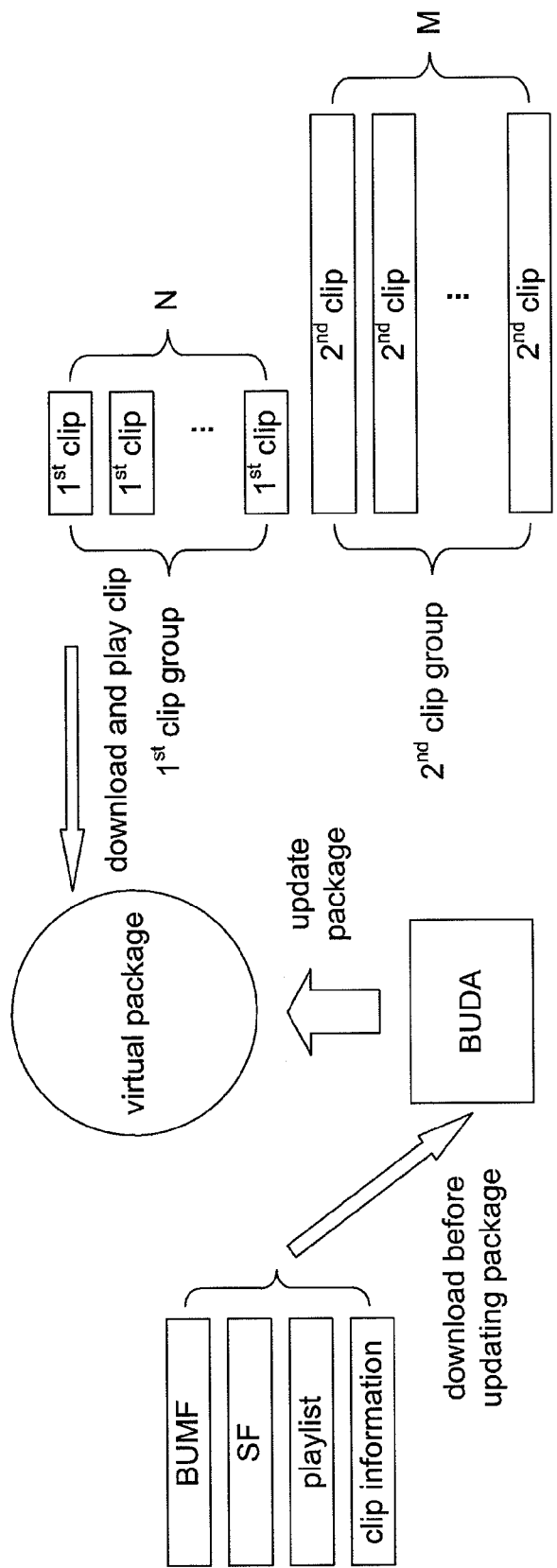
FIG. 6 is a diagram exemplifying a configuration for receiving a A/V data via a network in a playback apparatus supporting the BD-J specification in accordance with the present invention.

FIG. 6 is a diagram exemplifying a configuration for receiving the A/V data via a network in the playback apparatus supporting the BD-J specification in accordance with the present invention.

Referring to FIG. 6, the playback apparatus stores in a BUDA (Binding Unit Data Area) a BUMF information, a SF information, a playlist information and a clip information received from the A/V data providing server. The playback apparatus carries out a package update from a disk package to the virtual package based on the BUMF information, the SF information, the playlist information and the clip information stored in the BUDA.

When a configuration of the playback apparatus is complete, the playback apparatus plays the A/V data based on the playback sequence information, i.e., the playlist information. Specifically, the playback apparatus progressively receives the plurality of clips including the first clip group and the second clip group.

The playback apparatus progressively receives and plays the N first clips included in the first clip group. When the playback of the N first clips are finished, the playback apparatus progressively plays the M second clips included in the second clip group. The playback apparatus must receive the one of the M second clips which is to be played first before all of the N first clips are played in order to play the N first clips and the M second clips without interruption.

FIG. 7 is a diagram illustrating states of the clips according to time in accordance with the present invention.

The state of each clip may be one of R, W and P. Specifically, R represents that the corresponding clip is being received from the A/V data providing server, i.e., is in a receiving state. W represents the corresponding clip is waiting for playback, i.e., is in a waiting state. P represents the corresponding clip is being played in the playback apparatus, i.e., is in a playback state.

If the first size $S_s$ is 4 Mb, the second size $S_c$ is 40 Mb, the media network bandwidth MB is 2 Mbps, the customer network bandwidth CB is 4 Mbps and the number of buffered clips $B_a$ is 2, the number N must be 8 or higher according to the mathematical expression #2.

Therefore, assuming that the number N is 8, clip #1 through clip #8 are included in the first clip group and clip #9 and clip #10 are included in the second clip group.

The table in FIG. 7 will be described under an assumption that a time necessary for receiving each of the clips #1 through #8 from the A/V data providing server is 1 second, a time necessary for playing each of the clips #1 through #8 is 2 seconds and a time necessary for decoding each clips received by the playback apparatus is ignored.

From 0 to 1 second, the clip #1 is in the receiving state.

When 1 second lapses, the clip #1 is in the waiting state, and the clip #2 is in the receiving state.

When 2 seconds lapse, the clip #1 is in the playback state, the clip #2 is in the waiting state, and the clip #3 is in the receiving state.

When 3 seconds lapse, the clip #1 is in the playback state, the clip #2 is in the waiting state, the clip #3 is in the waiting state, and the clip #4 is in the receiving state.

When 4 seconds lapse, the clip #1 has finished playing, the clip #2 is in the playing state, the clip #3 is in the waiting state, the clip #4 is in the waiting state and the clip #5 is in the receiving state.

When 5 seconds lapse, the clip #2 is in the playback state, the clips #3, #4 and #5 are in the waiting state and the clip #6 is in the receiving state.

Similarly, the clip #8 is in the receiving state after 7 seconds and has finished playing after 18 seconds.

10 seconds are necessary for receiving the clip #9, because sizes of the clips #9 and #10 are 40 Mb each and the customer network bandwidth CB is 4 Mbps.

Therefore, in order to play the first clip group and the second clip group, the clip #9 should be in the receiving state when 8 seconds lapse.

In accordance with the present invention, the standby time is minimized as the playback apparatus supporting the BD-J specification receives and plays the one or more first clips having the first size included in the first clip group. In addition, the communication overhead is minimized as the playback apparatus receives and plays, during the playback of the one or more first clips, the one or more second clips having the second size larger than the first size.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A method for providing a progressive download service for an A/V data providing server and a playback apparatus supporting a BD-J specification, the method comprising steps of:
(a) preparing an A/V data;
(b) dividing the A/V data into a plurality of clips including a first clip group and a second clip group using a clip division information, wherein the first clip group includes one or more first clips each having a first size and the second clip group includes one or more second clips each having a second size larger than the first size; and
(c) transmitting the plurality of clips from the A/V data providing server to the playback apparatus,
wherein the clip division information comprises at least one of the first size, the second size, a number of the one or more first clips, a media network bandwidth of the A/V data, a customer network bandwidth necessary for transmitting the A/V data to the playback apparatus and a number of buffered clips,
wherein a first mathematical expression $$B_a \times \frac{S_s}{CB} + N \times \frac{S_s}{MB} \geq N \times \frac{S_s}{CB} + \frac{S_c}{CB}$$

is satisfied, where $S_s$ represents the first size, $S_c$ represent the second size, N represents the number of one or more first clips, MB represents the media network bandwidth, CB represents the customer network bandwidth and $B_a$ represents the number of buffered clips.

2. A method for providing a progressive download service for an A/V data providing server and a playback apparatus supporting a BD-J specification, the method comprising steps of:
(a) preparing an A/V data;
(b) dividing the A/V data into a plurality of clips including a first clip group and a second clip group using a clip division information, wherein the first clip group includes one or more first clips each having a first size and the second clip group includes one or more second clips each having a second size larger than the first size; and
(c) transmitting the plurality of clips from the A/V data providing server to the playback apparatus,
wherein the clip division information comprises at least one of the first size, the second size, a number of the one or more first clips, a media network bandwidth of the A/V data, a customer network bandwidth necessary for transmitting the A/V data to the playback apparatus and a number of buffered clips,
wherein the method further comprises:
obtaining the first size, the second size, the media network bandwidth, the customer network bandwidth and the number of buffered clips from the clip division information; and
selecting the number of the one or more first clips satisfying a second mathematical expression $$N \geq \frac{MB \times [S_c - B_a \times S_s]}{S_s \times [CB - MB]},$$

where Ss represents the first size, Sc represent the second size, N represents the number of one or more first clips, MB represents the media network bandwidth, CB represents the customer network bandwidth and Ba represents the number of buffered clips.

3. A method for providing a progressive download service for an A/V data providing server and a playback apparatus supporting a BD-J specification, the method comprising steps of:
(a) preparing an A/V data;
(b) dividing the A/V data into a plurality of clips including a first clip group and a second clip group using a clip division information, wherein the first clip group includes one or more first clips each having a first size and the second clip group includes one or more second clips each having a second size larger than the first size; and
(c) transmitting the plurality of clips from the A/V data providing server to the playback apparatus,
wherein the clip division information comprises at least one of the first size, the second size, a number of the one or more first clips, a media network bandwidth of the A/V data, a customer network bandwidth necessary for transmitting the A/V data to the playback apparatus and a number of buffered clips,
wherein the method further comprises:
obtaining the first size, the number of the one or more first clips, the media network bandwidth, the customer network bandwidth and the number of buffered clips; and
selecting the second size satisfying a third mathematical expression $$S_c \leq S_s \times \left[\frac{N(CB - MB) + B_a \times MB}{MB}\right],$$

where Ss represents the first size, Sc represent the second size. N represents the number of one or more first clips. MB represents the media network bandwidth, CB represents the customer network bandwidth and Ba represents the number of buffered clips.

4. A method for providing a progressive download service for an A/V data providing server and a playback apparatus supporting a BD-J specification, the method comprising steps of:

(a) preparing, by the A/V data providing server, an A/V data;

(b) dividing, by the A/V data providing server, the A/V data into a plurality of clips including a first clip group and a second clip group using a clip division information, wherein the first clip group includes one or more first clips each having a first size and the second clip group includes one or more second clips each having a second size larger than the first size; and (c) transmitting the plurality of clips from the A/V data providing server to the playback apparatus, wherein the clip division information comprises at least one of the first size, the second size, a number of the one or more first clips, a media network bandwidth of the A/V data, a customer network bandwidth necessary for transmitting the A/V data to the playback apparatus and a number of buffered clips, wherein a first mathematical expression $$B_a \times \frac{S_s}{CB} + N \times \frac{S_s}{MB} \geq N \times \frac{S_s}{CB} + \frac{S_c}{CB}$$

is satisfied, where Ss represents the first size, Sc represent the second size, N represents the number of one or more first clips, MB represents the media network bandwidth, CB represents the customer network bandwidth and Ba represents the number of buffered clips.

5. A method for providing a progressive download service for an A/V data providing server and a playback apparatus supporting a BD-J specification, the method comprising steps of:

(a) preparing, by the A/V data providing server, an A/V data;

(b) dividing, by the A/V data providing server, the A/V data into a plurality of clips including a first clip group and a second clip group using a clip division information, wherein the first clip group includes one or more first clips each having a first size and the second clip group includes one or more second clips each having a second size larger than the first size; and (c) transmitting the plurality of clips from the A/V data providing server to the playback apparatus, wherein the clip division information comprises at least one of the first size, the second size, a number of the one or more first clips, a media network bandwidth of the A/V data, a customer network bandwidth necessary for transmitting the A/V data to the playback apparatus and a number of buffered clips, the method further comprising:

obtaining the first size, the second size, the media network bandwidth, the customer network bandwidth and the number of buffered clips from the clip division information; and selecting the number of the one or more first clips satisfying a second mathematical expression $$N \geq \frac{MB \times [S_c - B_a \times S_s]}{S_s \times [CB - MB]},$$

where Ss represents the first size, Sc represent the second size, N represents the number of one or more first clips, MB represents the media network bandwidth, CB represents the customer network bandwidth and Ba represents the number of buffered clips.

6. A method for providing a progressive download service for an A/V data providing server and a playback apparatus supporting a BD-J specification, the method comprising steps of:

(a) preparing, by the A/V data providing server, an A/V data;

(b) dividing, by the A/V data providing server, the A/V data into a plurality of clips including a first clip group and a second clip group using a clip division information, wherein the first clip group includes one or more first clips each having a first size and the second clip group includes one or more second clips each having a second size larger than the first size; and (c) transmitting the plurality of clips from the A/V data providing server to the playback apparatus, wherein the clip division information comprises at least one of the first size, the second size, a number of the one or more first clips, a media network bandwidth of the A/V data, a customer network bandwidth necessary for transmitting the A/V data to the playback apparatus and a number of buffered clips, the method further comprising:

obtaining the first size, the number of the one or more first clips, the media network bandwidth, the customer network bandwidth and the number of buffered clips; and selecting the second size satisfying a third mathematical expression $$S_c \leq S_s \times \left[\frac{N(CB - MB) + B_a \times MB}{MB}\right],$$

where Ss represents the first size, Sc represent the second size, N represents the number of one or more first clips, MB represents the media network bandwidth, CB represents the customer network bandwidth and Ba represents the number of buffered clips.

* * * * *